# UNITED STATES PATENT OFFICE.

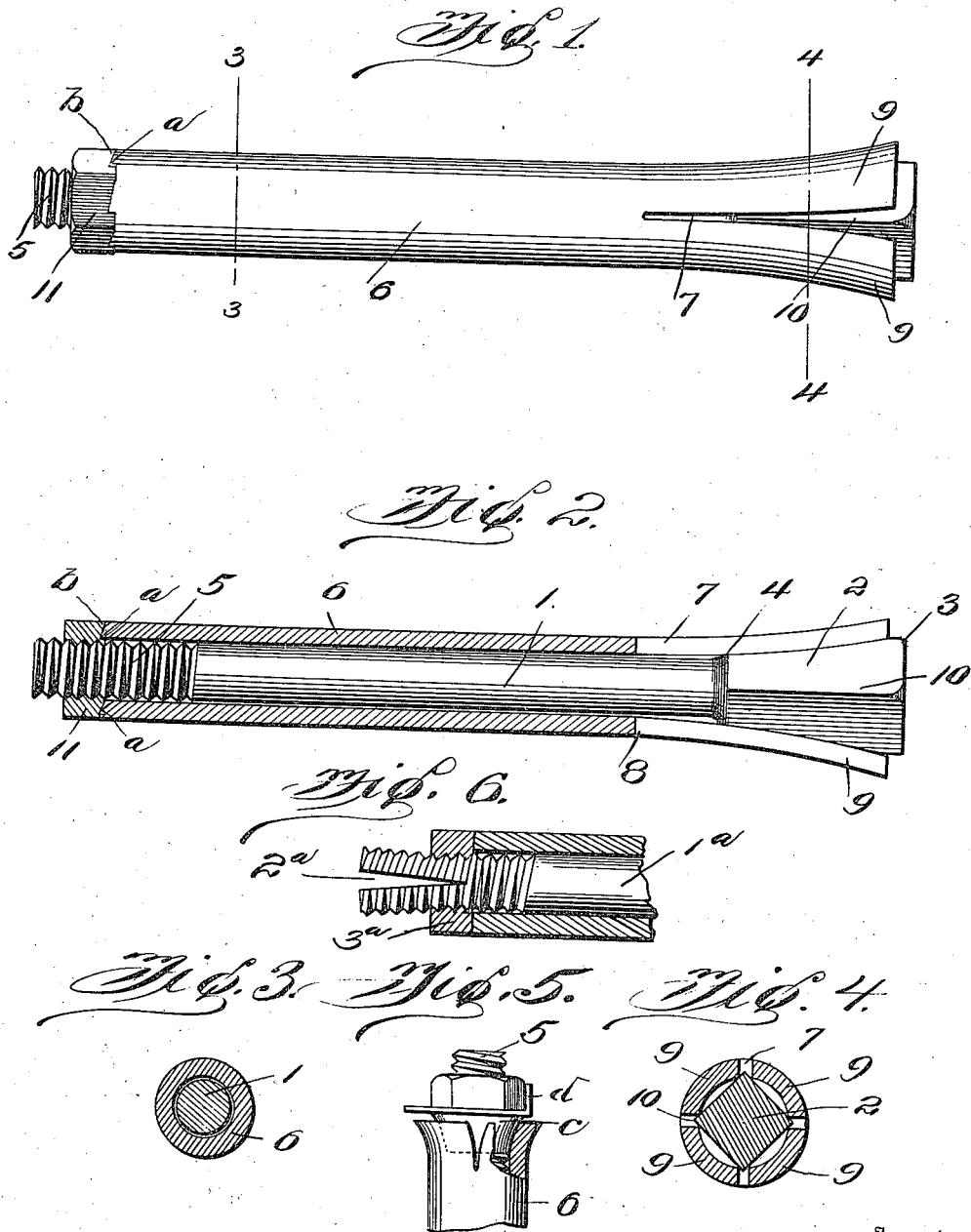

C BURTON SKIDMORE, OF SIOUX CITY, IOWA.

EXPANSION-BOLT.

948,938.　　Specification of Letters Patent.　　Patented Feb. 8, 1910.

Application filed June 22, 1909. Serial No. 503,671.

*To all whom it may concern:*

Be it known that I, C BURTON SKIDMORE, a citizen of the United States of America, residing at Sioux City, in the county of Woodbury and State of Iowa, have invented new and useful Improvements in Expansion-Bolts, of which the following is a specification.

This invention relates to expansion bolts, and one of the principal objects of the same is to provide a bolt adapted to be placed in a hole or socket in a wall or ceiling and more particularly in concrete and metal buildings, said bolt adapted to be expanded after it has been placed in position in the hole made for it.

Another object of the invention is to provide an expansion bolt comprising the bolt proper having a tapering rectangular head and a threaded end, said bolt being placed within a sleeve provided with slots extending from one end, the corners of the head of the bolt fitting into said slots and a nut at the opposite end of the bolt for moving the bolt within the sleeve to spread the slotted end thereof to hold the bolt in place in the hole made for the same in the concrete wall or ceiling.

These and other objects may be attained by means of the construction illustrated in the accompanying drawing, in which,—

Figure 1 is a side elevation of an expansion bolt made in accordance with my invention. Fig. 2 is a longitudinal section of the sleeve which surrounds the bolt, said bolt being shown in elevation. Fig. 3 is a sectional view taken on the line 3—3 of Fig. 1, looking in the direction indicated by the arrow. Fig. 4 is a similar view taken on the line 4—4 of Fig. 1, looking in the direction indicated by the arrow. Fig. 5 is a detail side elevation of a modified form of my invention. Fig. 6 is a detail section, showing a modified form of bolt.

Referring to the drawing, the numeral 1 designates the bolt proper comprising a solid shank portion having a tapering head 2 thereon, said head being substantially rectangular in cross section and tapering from the outer surface 3 to the point 4 which merges into the shank of the bolt. The opposite end of the bolt is threaded, as at 5. Surrounding the bolt 1 is a sleeve 6, said sleeve having at one end a series of slots 7 extending from the end of the sleeve to a point 8 some distance from said end, thus providing expansible members 9. The opposite end of the sleeve 6 is provided with ratchet teeth $a$ which engage teeth or projections $b$ on the nut 11.

As shown in Figs. 1 and 2, the corners 10 of the head of the bolt are disposed in the slots 7 in the sleeve 6, and when the nut 11 is applied to the threaded portion 5 of the bolt and turned, the head 2 of the bolt is moved within the socket made for the same.

As shown in Fig. 5, a washer $c$ is provided with a tapering tubular portion through which the bolt passes, said tubular portion being inserted within the sleeve 6 and the nut then turned upon the washer to partly expand this end of the tube, said nut being held from turning by bending up one corner $d$ of the washer.

As shown in Fig. 6 the bolt $1^a$ is split, as at $2^a$, in its end, and the nut $3^a$ may be of the ordinary type, the split portion of the bolt serving to lock the nut in place when adjusted and to also permit readjustment of the same.

From the foregoing, it will be obvious that an expansion bolt made in accordance with my invention is of simple construction, the sleeve surrounding the bolt having a smooth interior bore and expansion members formed by slotting the end of the sleeve. This construction involves but little labor in its production, can be manufactured at low cost and is reliable and efficient for its purpose.

I claim:—

1. An expansion bolt comprising a bolt proper having a tapering retangular head, a sleeve surrounding said bolt, said sleeve having a series of slots in one end thereof, expansible members intermediate the slots, the opposite end of said tube having teeth thereon, and a nut applied to the threaded portion of the bolt, said nut having locking teeth to engage the teeth on the sleeve.

2. An expansion bolt comprising a bolt proper having a tapering head of rectangular cross section, a sleeve surrounding said bolt, said sleeve being provided with a series of slots in one end thereof to provide intermediate expansible members, the head of said bolt being disposed with its corners in said slots, and a nut fitted to the threaded end of said bolt and provided with means for locking the same to said sleeve.

In testimony whereof I affix my signature in presence of two witnesses.

C BURTON SKIDMORE.

Witnesses:
 FRED OLSON,
 A. O. WAKEFIELD.